United States Patent
Miyauchi et al.

(10) Patent No.: US 9,205,811 B2
(45) Date of Patent: Dec. 8, 2015

(54) WASHER NOZZLE

(75) Inventors: Kiyoshi Miyauchi, Shizuoka (JP); Takahiro Yamaguchi, Shizuoka (JP)

(73) Assignee: NIPPON VINYLON CO., LTD., Shizuoka (JP)

( * ) Notice: Subject to any disclaimer, the term of this patent is extended or adjusted under 35 U.S.C. 154(b) by 308 days.

(21) Appl. No.: 13/698,070

(22) PCT Filed: May 20, 2011

(86) PCT No.: PCT/JP2011/061612
§ 371 (c)(1),
(2), (4) Date: Nov. 15, 2012

(87) PCT Pub. No.: WO2011/148865
PCT Pub. Date: Dec. 1, 2011

(65) Prior Publication Data
US 2013/0062436 A1    Mar. 14, 2013

(30) Foreign Application Priority Data
May 27, 2010   (JP) .................................. 2010-121491

(51) Int. Cl.
*B05B 1/10*   (2006.01)
*B60S 1/52*   (2006.01)
*B05B 1/08*   (2006.01)

(52) U.S. Cl.
CPC .... *B60S 1/52* (2013.01); *B05B 1/08* (2013.01)

(58) Field of Classification Search
CPC .............. B60S 1/52; B60S 1/46; B05B 1/08; B05B 1/10; B05B 1/30
USPC ........ 239/428.1, 428.2, 505, 589, 589.1, 600, 239/514, 519
See application file for complete search history.

(56) References Cited

U.S. PATENT DOCUMENTS 5,934,518 A  *  8/1999  Stern et al. .................. 222/402.1
6,286,766 B1    9/2001  Mitsui et al.
6,354,515 B1 *  3/2002  Matsumoto et al. ........ 239/284.1

FOREIGN PATENT DOCUMENTS

| JP | 11-300235    | 11/1999 |
| JP | 2000-238867  | 9/2000  |
| JP | 2001-010452  | 1/2001  |
| JP | 2005-059651  | 3/2005  |
| JP | 2009-029330  | 2/2009  |
| JP | 2009-099772  | 5/2009  |

OTHER PUBLICATIONS

International Search Report issued Jul. 5, 2011 in International (PCT) Application No. PCT/JP2011/061612.

* cited by examiner

*Primary Examiner* — Jason Boeckmann
(74) *Attorney, Agent, or Firm* — Wenderoth, Lind & Ponack, L.L.P.

(57) ABSTRACT

A washer nozzle (1) includes a nozzle body (2), a nozzle tip (11) which is mounted within the nozzle body (2), and a nozzle holder (15) having a head portion (9) for storing the nozzle body (2) and also has a supply portion (10) for supplying a cleaning liquid. The nozzle body (2) has a partitioning plate (4) configured to partition the spray orifice into two-tiered parts, and also has a guide portion (3) for guiding liquid spray. The nozzle body (2) of the washer nozzle (1) is configured so that the relative angle between upper liquid spray and lower liquid spray can be changed by making the length (a) of a guide region variable, the guide region extending in the direction of the center axis (c) of the nozzle body from the front end surface of the partition plate to the front end surface of the guide portion (3).

11 Claims, 11 Drawing Sheets

WASHER NOZZLE

TECHNICAL FIELD

The present invention relates to a washer nozzle configured to spray cleaning liquid onto windshields or rear windows or the like of motor vehicles.

BACKGROUND ART

In the prior art, since a washer nozzle for a motor vehicle configured to be fixed on a vehicle engine hood may impair an appearance in terms of design of the vehicle, the washer nozzle provided on a lower surface of a rear portion of the vehicle engine hood (JP2005-59651 (A)) is known. This is configured to cause a diffusional spray flow to land extensively in the vehicle width direction, control and rectify diffusion of a diffusional flow sprayed from a diffusional spray orifice in the vehicle vertical direction in cooperation with an upper correcting plate portion (diffusion control portion) and an opening lower wall surface portion, and cause the diffusional spray flow to land onto a target point without interference from an extremely narrow gap between a wiper arm and an engine hood rear end edge.

CITATION LIST

Patent Literature

A washer nozzle 1 illustrated in prior art FIG. 8A and FIG. 8B sprays cleaning liquid from a supply portion 10 of a nozzle holder 15 from a spray orifice toward a vehicle via an oscillation chamber for self-oscillation provided on a nozzle tip 11 to be mounted on a nozzle body 2 stored in a head portion 9 of the nozzle holder 15. However, although a guide portion 3 of the nozzle body 2 is configured to control and also rectify the diffusion of the cleaning liquid spray in the vertical direction, the structure of the guide portion 3 is such that the guide portion 3 is formed integrally with the nozzle body 2 or the nozzle tip 11, that is, a fixed structure, and hence a diffusion angle of the cleaning liquid spray in the vertical direction cannot be variable. Known washer nozzle apparatus described in JP2001-10452 (A) are a type configured to determine the direction of jet spray of the cleaning liquid by providing a liquid guide portion at the spray orifice and opening the same leftward and rightward as illustrated in FIG. 9A of this application, and a type in which the spray angle of a water channel is determined in advance as illustrated in FIG. 9B of this application. In this case as well, the spray direction is determined depending on the angle of a guide surface in the water channel or the angle of the water channel itself, and hence the spray angle is constant. The spray angle of the washer nozzle cannot be changed as needed. In this manner, it is necessary to prepare washer nozzles changed in mutual angle of the cleaning liquid in the vertical direction respectively, and the mutual angle of the cleaning liquid spray in the vertical direction cannot be changed easily. The washer nozzle according to the invention is proposed in order to solve the problems described above.

SUMMARY OF THE INVENTION

The washer nozzle according to the present invention is a washer nozzle including: a nozzle body; a nozzle tip to be mounted in the interior of the nozzle body; and a nozzle holder having a head portion configured to store the nozzle body and a supply portion configured to supply cleaning liquid, wherein the nozzle body includes: a spray orifice configured to spray the cleaning liquid; a partitioning plate configured to partition the spray orifice into two-tiered parts; and a guide portion configured to be projected from an outer peripheral portion of the spray orifice of the nozzle body along the direction of a center axis of the nozzle body in order to guide the cleaning liquid spray sprayed from the spray orifice, wherein the guide portion is provided with a variable means (variable length part) for changing the length of the guide portion along the direction of the center axis of the nozzle body and the length of the guide portion is changed, so that the length of a guide area from a distal end surface of the partitioning plate to a distal end surface of the guide portion is made variable in order to solve the above-described problem.

The variable means for changing the length of the guide portion is preferably at least one slit formed on an outer peripheral surface of the guide portion at adequate intervals in the direction of the center axis, and formed so as to allow the guide portion to be cut along the slit.

The variable means for changing the length of the guide portion may be variable means including the guide portion having a guide base portion formed directly on the outer peripheral portion of the spray orifice of the nozzle body and at least one extending guide to be demountably mounted on the guide base portion so as to extend along the direction of the center axis, and the length of the guide portion is made variable depending on mounting and demounting of the extension guide with respect to the guide base.

The partitioning plate for partitioning the spray orifice of the nozzle body into the two-tiered portions preferably includes front and back surfaces parallel to each other.

When the guide portion includes a pair of guide plates projecting so as to extend from upper and lower positions of the outer peripheral portion of the spray orifice along the direction of the center axis, and when a length a of the guide area is within a range of $0 \text{ mm} < a \leq 0.2 \text{ mm}$, upper and lower liquid sprays are joined into a single tier spray.

According to the washer nozzle of the present invention, the upper and lower liquid sprays can be sprayed at a wide angle or sprayed at a reduced distance between the upper and lower liquid sprays by increasing or decreasing the length of the guide area of the guide portion of the spray orifice. When the length of the guide area of the guide portion is set to almost zero, the upper and lower liquid sprays are joined, and may be sprayed in a state of a single tier spray. In this manner, a superior effect that the state of spray of the upper and lower liquid sprays of the cleaning liquid can be changed easily by changing the length of the guide portion easily by cutting or addition is achieved. Furthermore, even when the mounting conditions of the washer nozzle are varied, it may be accommodated as needed.

DESCRIPTION OF EMBODIMENTS

Figure 1A:
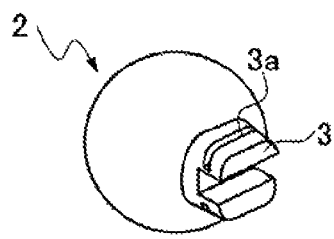
FIG. 1A is a perspective view of a nozzle body as a first example of a washer nozzle according to the present invention.

The washer nozzle 1 of the present invention is configured to achieve easy control of a cleaning liquid spray state by decreasing and/or increasing a length a of a guide area from a distal end surface 4b of a partitioning plate 4 to a distal end surface 3b of a guide portion 3 from a default length as illustrated in FIG. 1A to FIG. 2D.

EXAMPLE 1

Figure 1B:
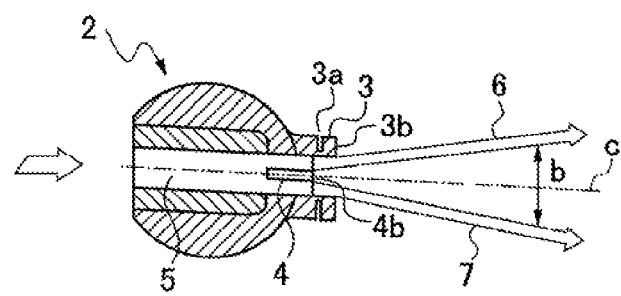
FIG. 1B is a cross-sectional view for explaining a usage state of the nozzle body illustrated in FIG. 1A.

FIG. 1A to FIG. 1D illustrate a washer nozzle according to a first example of the present invention, and a variable means (variable length part) for changing the length of the guide portion 3 in the direction of a center axis c is a slit 3a formed in an outer peripheral surface of the guide portion 3. Although one slit 3a is provided at each location in FIG. 1A and FIG. 1B, a configuration in which a plurality of slits are provided at a plurality of locations at adequate intervals so as to allow the length a of the guide area to be changed to three or more different lengths may also be applicable. In this configuration, as illustrated in FIG. 1B, the pressure above and below a nozzle distal end is lowered, a pressure difference from the pressure between liquid sprays 6, 7 is generated so that the upper liquid spray 6 and the lower liquid spray 7 are sprayed at a wider distance from each other. Although the entire part of the washer nozzle of the present invention is illustrated in FIG. 4A, FIG. 4B, FIG. 5A, FIG. 5B, FIG. 6A and FIG. 7A, a clear shape of the washer nozzle according to the present invention is similar to the washer nozzle 1 illustrated in prior art FIG. 8A and FIG. 8B, and includes a nozzle body 2, a nozzle tip 11 to be mounted in the interior of the nozzle body 2, a head portion 9 configured to store the nozzle body 2, and a nozzle holder 15 having a supply portion 10 for supplying the cleaning liquid.

As illustrated in FIG. 1B, FIG. 1D, FIG. 2B, and FIG. 2D, the nozzle body 2 of the washer nozzle 1 has the partitioning plate 4 on the spray orifice side of an oscillating flow channel 5, whereby the two-tiered spray orifice is formed. The partitioning plate 4 is provided in the spray orifice, is configured to divide the flow channel into upper and lower parts, extends along the direction of the center axis c of the nozzle body 2, and includes front and rear surfaces parallel to each other. In addition, the guide portion 3 configured to guide the upper liquid spray 6 and the lower liquid spray 7 sprayed as cleaning liquid is configured to project from the outer peripheral portion of the spray orifice along the direction of the center axis c of the nozzle body 2 and is configured to allow the length of the guide portion 3 in the spray direction, that is, the length in the direction of the center axis c to be changed by the variable means. Also, as illustrated, the guide portion 3 is constituted by upper and lower guide plates projecting in a length direction and being spaced apart from each other by a distance that is constant along the length direction, and the upper and lower guide plates have mutually facing flat guide surfaces.

Figure 8A:
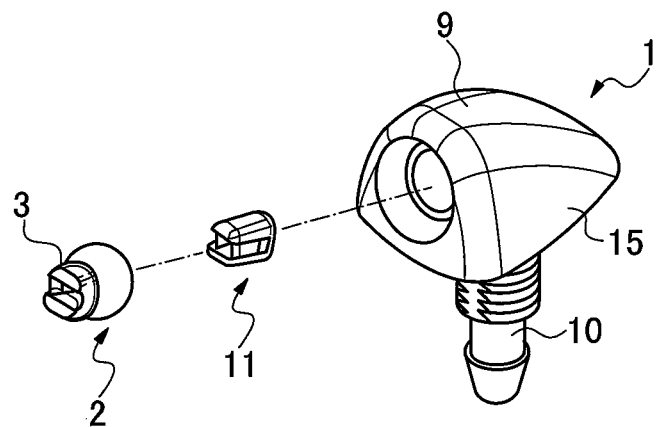
FIG. 8A is an exploded perspective view illustrating a configuration of the washer nozzle of the prior art.
Figure 8B:
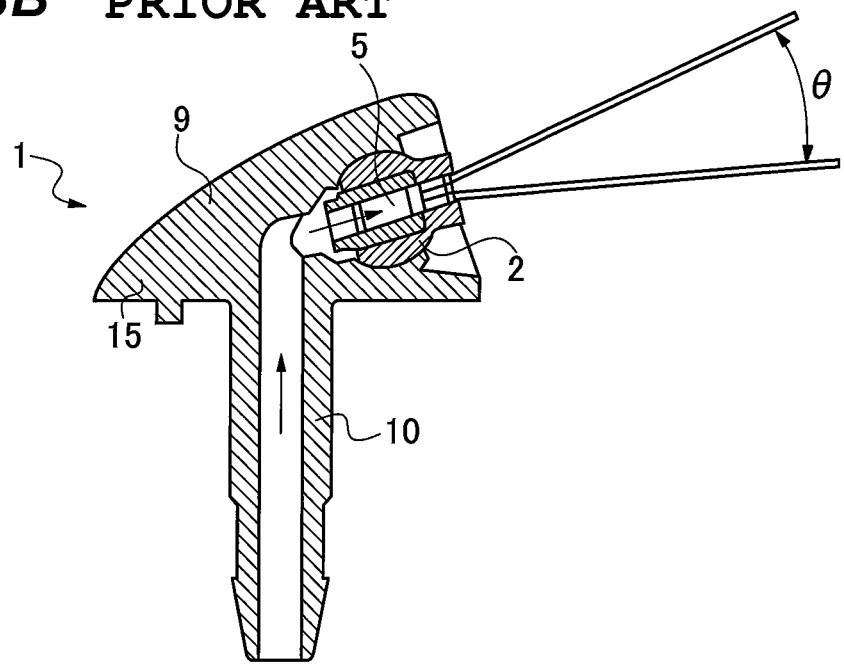
FIG. 8B is a vertical cross-sectional view of the washer nozzle illustrated in FIG. 8A.
Figure 9A:
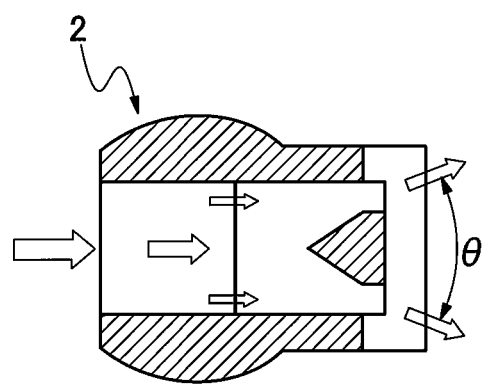
FIG. 9A is a cross-sectional view of a nozzle body of the washer nozzle of the prior art in which a guide surface is disposed on a spray orifice so as to provide a diffusion angle θ.
Figure 9B:
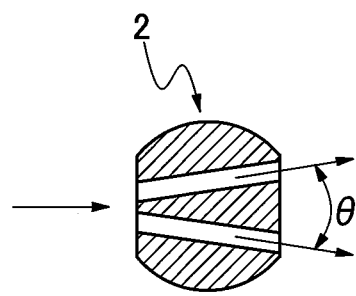
FIG. 9B is a cross-portional view of the nozzle body of the washer nozzle of the prior art in which water channels themselves are formed to have an angle θ with respect to each other so as to provide the diffusion angle θ.

When cutting the guide portion 3 at the slit 3a, a cutting tool (nipper or the like) is used to cut the guide portion 3 formed of a synthetic resin along the slit 3a in a state in which the nozzle body 2 is fitted in the head portion of the nozzle holder 15 (equivalent to the head portion 9 illustrated in FIG. 8A and FIG. 8B).

Figure 1C:
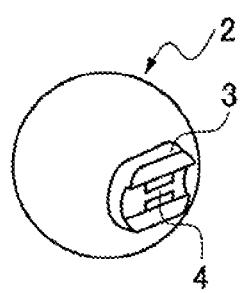
FIG. 1C is a perspective view of the nozzle body of the first example in a case where the length of a guide area is reduced by cutting a guide portion of the nozzle body.
Figure 1D:
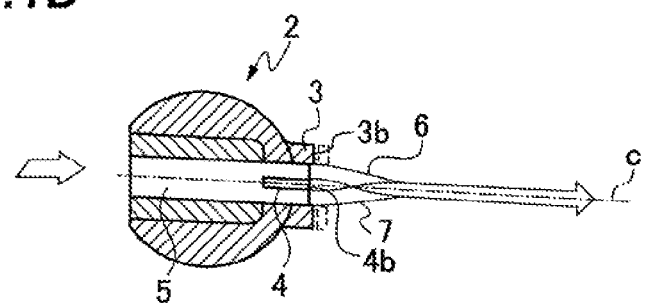
FIG. 1D is a cross-sectional view for explaining the usage state of the nozzle body illustrated in FIG. 1C.

As illustrated in FIG. 1C and FIG. 1D, when the length a of the guide area of the guide portion 3 is reduced, the liquid sprays 6, 7 approach each other toward the center axis c from the upper and lower direction. When the liquid sprays 6, 7 are attracted toward the center direction (attracting direction) and the mutual distance between the upper and lower liquid sprays 6, 7 is reduced, if the length a of the guide area is substantially 0 (zero) as illustrated in FIG. 1D, the joined state as a single tier spray is assumed.

EXAMPLE 2

Figure 2A:
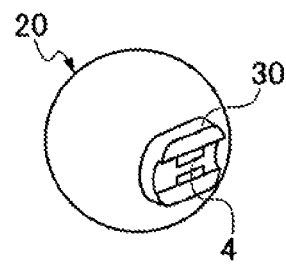
FIG. 2A is a perspective view of the nozzle body as a second example of the washer nozzle of the present invention.
Figure 2B:
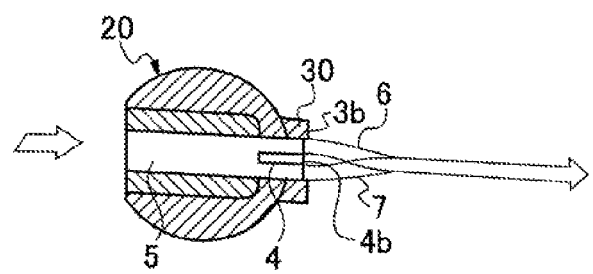
FIG. 2B is a cross-sectional view for explaining the usage state of the nozzle body illustrated in FIG. 2A.
Figure 2C:
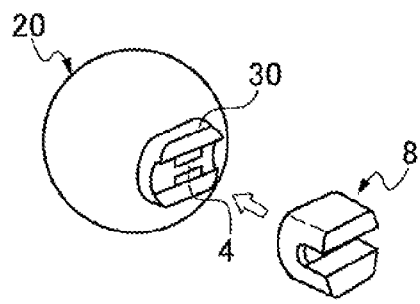
FIG. 2C is a perspective view of the nozzle body of the second example in a case where the length of the guide area is increased by attaching an extension guide to a guide base portion of the nozzle body.
Figure 2D:
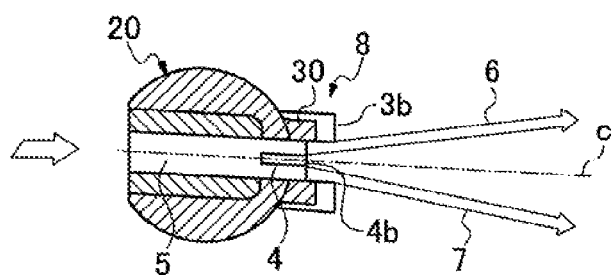
FIG. 2D is a cross-sectional view for explaining the usage state of the nozzle body illustrated in FIG. 2C.

As illustrated in FIG. 2A and FIG. 2D, in a second example of the invention, the variable means which changes the length of the guide portion 3 in the direction of the center axis c is configured to be capable of varying the length of the guide portion 3 by mounting and demounting the extension guide 8 by configuring the guide portion 3 of a guide base portion 30 directly formed on an outer peripheral portion of a spray orifice of a nozzle body 20 and an extension guide 8 configured to be demountably mountable on the guide base portion 30 so as to provide an extension along the direction of the center axis c.

In the nozzle body 20 illustrated in FIGS. 2A, 2B, the guide portion 3 is only composed of the guide base portion 30, and the length a of the guide area of the guide portion 3 is substantially zero. When increasing the length a of the guide area, the guide portion 3 is composed of the guide base portion 30 and the extension guide 8 by mounting the demountable extension guide 8 on the spray orifice side of the guide base portion 30 as illustrated in FIG. 2C and FIG. 2D. By this mounting, the length of the entire guide portion 3 is increased, and hence the length a of the guide area is also increased. Depending on the case, a plurality of the extension guides 8, 8 . . . fitted continuously may be mounted on the guide base portion 30. Alternatively, it is also possible to prepare the extension guides 8 having different lengths and mount the extension guide 8 of any length as needed. The extension guide 8 is configured to be demountably mounted on the guide base portion 30 by a combination of a concave-convex locking projection and a locking groove or the like. Since the extension guide 8 is demountably mounted in the case of the second example, the length a of the guide area may be reduced by reducing the entire length of the guide portion 3 by removing the extension guide 8.

A mutual distance b between the upper and lower liquid sprays 6, 7 may be increased by increasing the length a of the guide area of the guide portion 3. Since any means may be employed as long as the mutual distance b between the upper and lower liquid sprays 6, 7 may be changed by changing the length a of the guide area, the variable means may be configured to expand and contract the guide portion by a method using other known mechanical means and, for example, the variable means configured to expand and contract the guide portion in the spray direction by employing screw means and moving the guide portion straight ahead in the direction of an axis of the screw by rotating the screw may also be applicable.

Figure 3A:
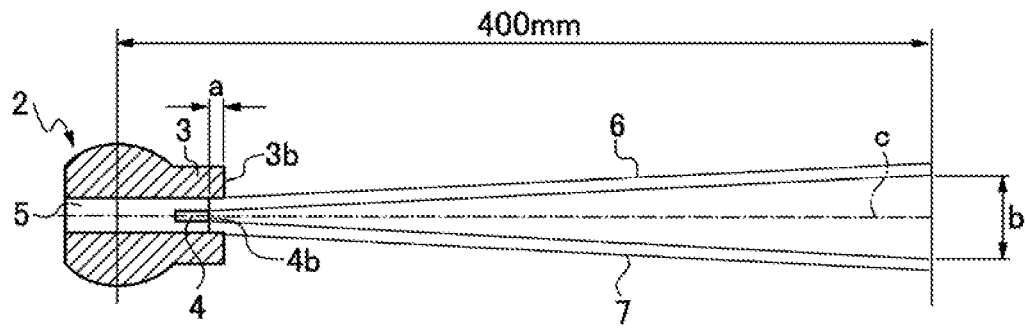
FIG. 3A is a cross-sectional view for explaining measurement of a change of a mutual distance b of the upper and lower liquid sprays with respect to a change of a length a of the guide area of the nozzle body of the washer nozzle according to the present invention.
Figure 3B:
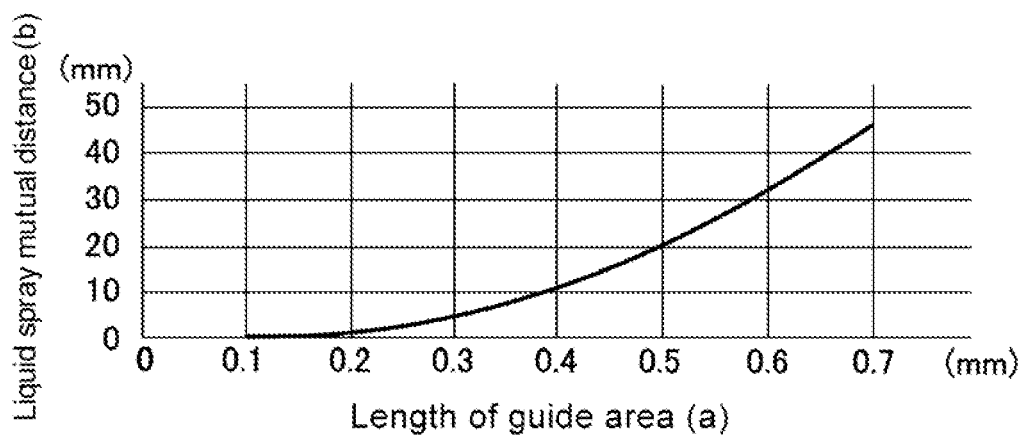
FIG. 3B is a graph showing a result of measurement of the change of the mutual distance b of the upper and lower liquid sprays with respect to the change of the length a of the guide area.

In the guide portion 3 including a pair of guide plates projecting from upper and lower positions of the outer peripheral portion of the spray orifice, as illustrated in FIG. 3A, an experiment was conducted for measuring the relationship between the length a of the guide area and the mutual distance b between the upper and lower liquid sprays 6, 7 at a position at 400 mm apart from the center of the nozzle body by changing the length a of the guide area of the guide portion 3 by the variable means. The result is as shown in a graph in FIG. 3B. It is understood that although the upper and lower liquid sprays 6, 7 join and are in a state of the single tier spray in a range in which the length a of the guide area is shown by $0 < a \leq 0.2$ mm, the distance b is increased as the length a of the guide area increases, specifically within a range exceeding 0.2 mm and, for example, it is shown a fact that the distance b reaches substantially 45 mm when the length a of the guide area is 0.7 mm.

Figure 4A:
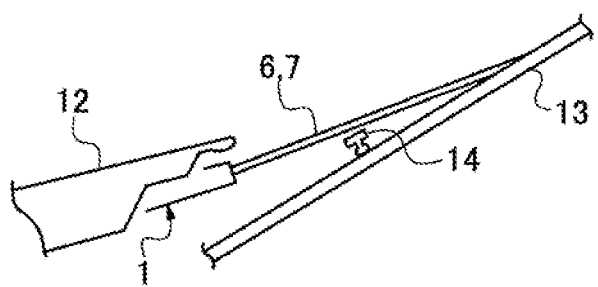
FIG. 4A is a partial cross-sectional view illustrating a mounting portion on which the washer nozzle of the present invention is mounted under a rear end portion of the hood when a configuration in which two liquid sprays are sprayed in a joined manner.
Figure 4B:
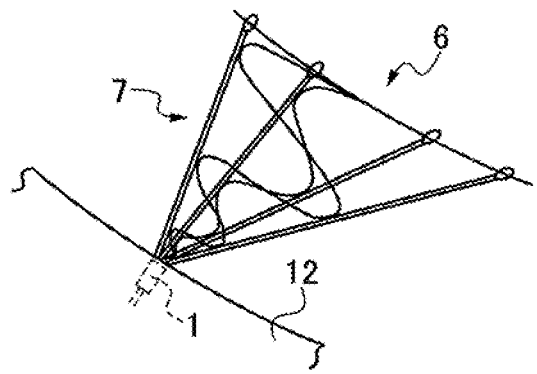
FIG. 4B is a partial plan view illustrating an example of usage of the washer nozzle of the present invention illustrated in FIG. 4A in a case where the length of the guide area is short and a case where diffusion widths of the two liquid sprays in the lateral direction are different.
Figure 4C:
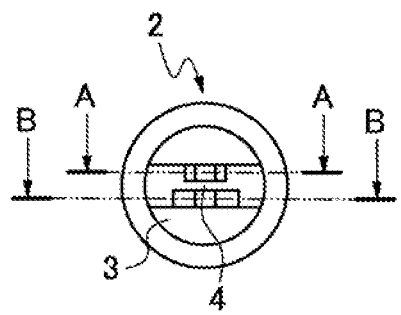
FIG. 4C is a front view of the nozzle body of the washer nozzle of the present invention illustrated in FIG. 4B.
Figure 4D:
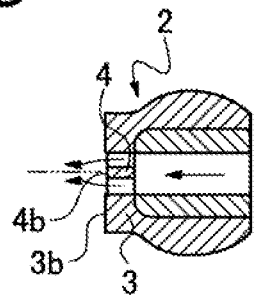
FIG. 4D is a vertical cross-sectional view of the nozzle body illustrated in FIG. 4C.
Figure 4E:
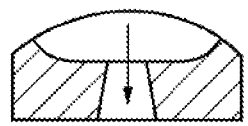
FIG. 4E is a cross-sectional view taken along the line A-A in FIG. 4C.
Figure 4F:
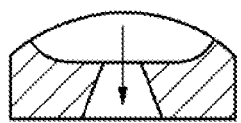
FIG. 4F is a cross-sectional view taken along the line B-B in FIG. 4C.

An example of usage of the washer nozzle 1 as described above will be described. As illustrated in FIG. 4A, by setting the length a of the guide area to a range indicated by $0 < a \leq 0.2$ mm and setting the liquid sprays 6, 7 of the nozzle body 2 to a single tier spray, it is preferable to be used when a gap between a rear end portion of a hood and a wiper arm (not illustrated) and a wiper blade 14 is small when being mounted under the rear end portion of a hood 12. Also, in the case of the single tier spray where the diffusion widths of the upper and lower liquid sprays 6, 7 in the lateral direction are different (diffusion angle are 30 degrees and 60 degrees) as illustrated in FIG. 4C, FIG. 4E, and FIG. 4F, there is formed a concentrated part of the liquid sprays 6, 7 at four positions on the same spray surface as illustrated in FIG. 4B.

Figure 5A:
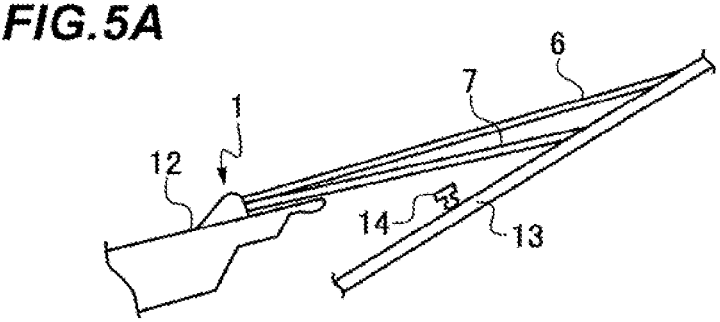
FIG. 5A is a partial cross-sectional view illustrating a mounting portion on which the washer nozzle of the present invention configured to spray the two liquid sprays in a separated state is mounted on an upper surface of the hood or on a cowl panel.
Figure 5B:
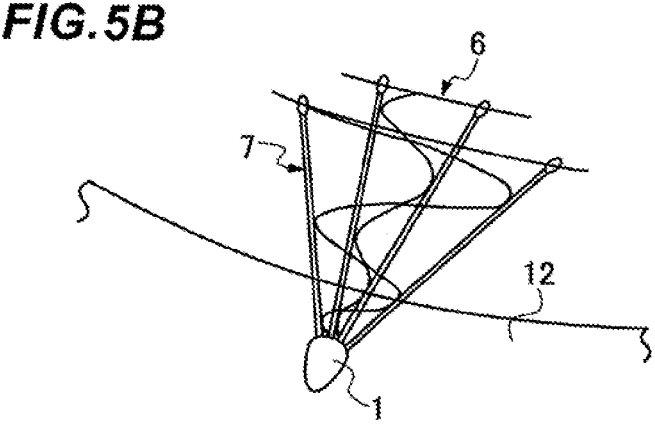
FIG. 5B is a partial plan view showing an example of usage of the washer nozzle of the present invention illustrated in FIG. 5A in a case where the length of the guide area is long and a case where the diffusion widths of the two liquid sprays in the lateral direction are different.
Figure 5C:
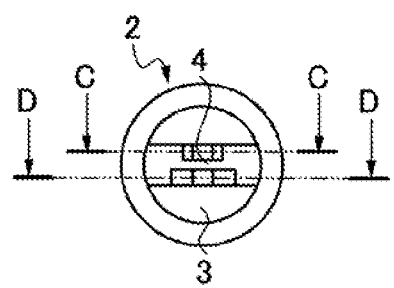
FIG. 5C is a front view of the nozzle body of the washer nozzle of the present invention illustrated in FIG. 5B.
Figure 5D:
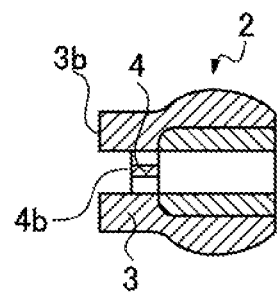
FIG. 5D is a vertical cross-sectional view of the nozzle body illustrated in FIG. 5C.
Figure 5E:
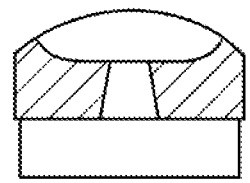
FIG. 5E is a cross-sectional view taken along the line C-C in FIG. 5C.
Figure 5F:
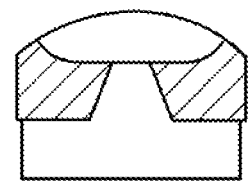
FIG. 5F is a cross-sectional view taken along the line D-D in FIG. 5C.

When increasing the mutual distance between the upper and lower liquid sprays 6, 7, as illustrated in FIG. 5A, the washer nozzle 1 may be mounted on an upper surface of the hood 12 or on a cowl panel, so that, in other words, this configuration can be applied to a case where the wiper arm (not illustrated) and the wiper blade 14 or the like do not become obstacles. In this example of usage, a wide range of a glass surface of a windshield 13 may be brought into a wet state with the spray liquid. Also, as illustrated in FIG. 5C, FIG. 5E, and FIG. 5F, when the diffusion widths in the lateral direction are different between the upper liquid spray 6 and the lower liquid spray 7, the concentrated parts are formed between both ends of the respective liquid sprays 6, 7 as illustrated in FIG. 5B.

When the diffusion widths of the liquid sprays 6, 7 in the lateral direction are the same and the length a of the guide area is long, the liquid spray is opened upward and downward and the concentrated parts of the liquid spray are generated at both ends respectively. When the length a of the guide area is short, the liquid sprays 6, 7 are sprayed in the joined manner, and the concentrated parts of the liquid spray are generated at two positions on the same spray surface.

Figure 6A:
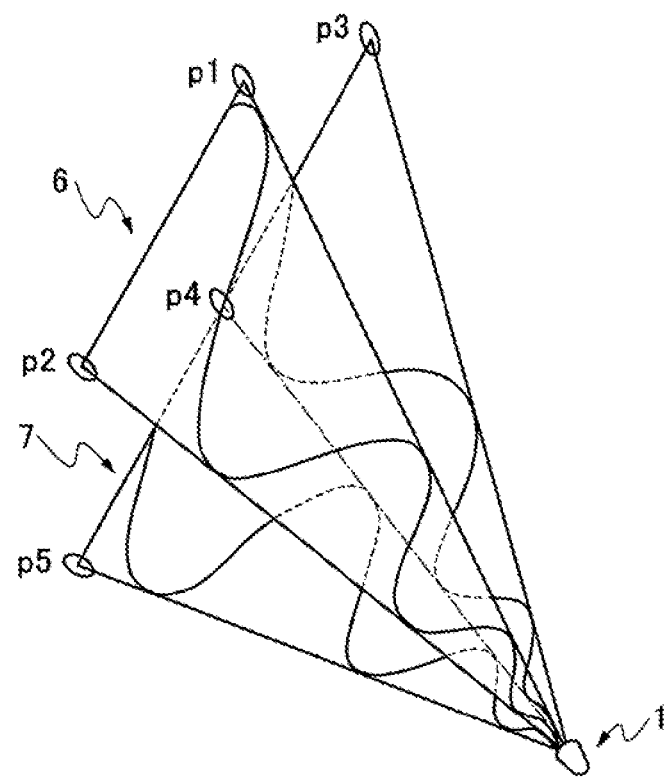
FIG. 6A is a plan view of the nozzle body of the washer nozzle of the present invention in which the numbers of upper and lower spray orifices are different, and the upper spray orifice is formed to have a liquid spray diffusion angle of 30 degrees and the lower spray orifice is formed to have a liquid spray diffusion angle of 60 degrees to divide the liquid spray into two parts, illustrating a state of diffusion of the liquid spray when the length of the guide area is increased.
Figure 6B:
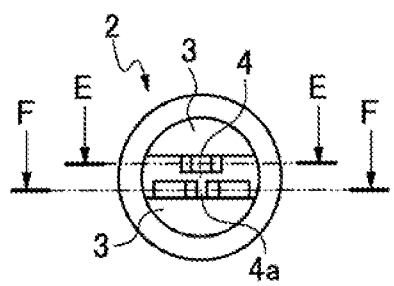
FIG. 6B is a front view of the nozzle body of the washer nozzle of the present invention illustrated in FIG. 6A.
Figure 6C:
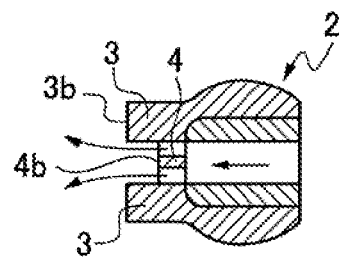
FIG. 6C is a vertical cross-sectional view of the nozzle body illustrated in FIG. 6B.
Figure 6D:
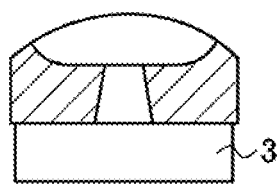
FIG. 6D is a cross-sectional view taken along the line E-E in FIG. 6B.
Figure 6E:
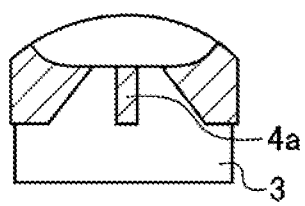
FIG. 6E is a cross-sectional view taken along the line F-F in FIG. 6B.

The numbers of the upper and lower spray orifices may be different from each other. For example, a configuration in which the upper spray orifice of the partitioning plate 4 is a single spray orifice formed so as to cause the upper liquid spray 6 to be set at a diffusion angle of 30 degrees, and the lower spray orifice of the partitioning plate 4 is formed so as to cause the lower liquid spray 7 to be set at a diffusion angle of 60 degrees, and a dividing plate 4a is formed at the center of the lower spray orifice, whereby the spray orifice is divided into two parts on the left and right sides is also applicable. When the length a of the guide area is sufficiently long, for example, 0.7 mm, the liquid sprays 6, 7 are sprayed in the state of being opened upward and downward as illustrated in FIG. 6A, and the upper liquid spray 6 is widened to 30 degrees leftward and rightward and generates concentrated parts (p1, p2) at both ends thereof, and the lower liquid spray 7 is diffused to 60 degrees leftward and rightward. However, the amplitude of the liquid spray 7 is divided into two parts by the dividing plate 4a, which is a central partition, and the concentrated parts (p3, p4, p5) are generated at three positions including both the left and right ends and the center thereof.

Figure 7A:
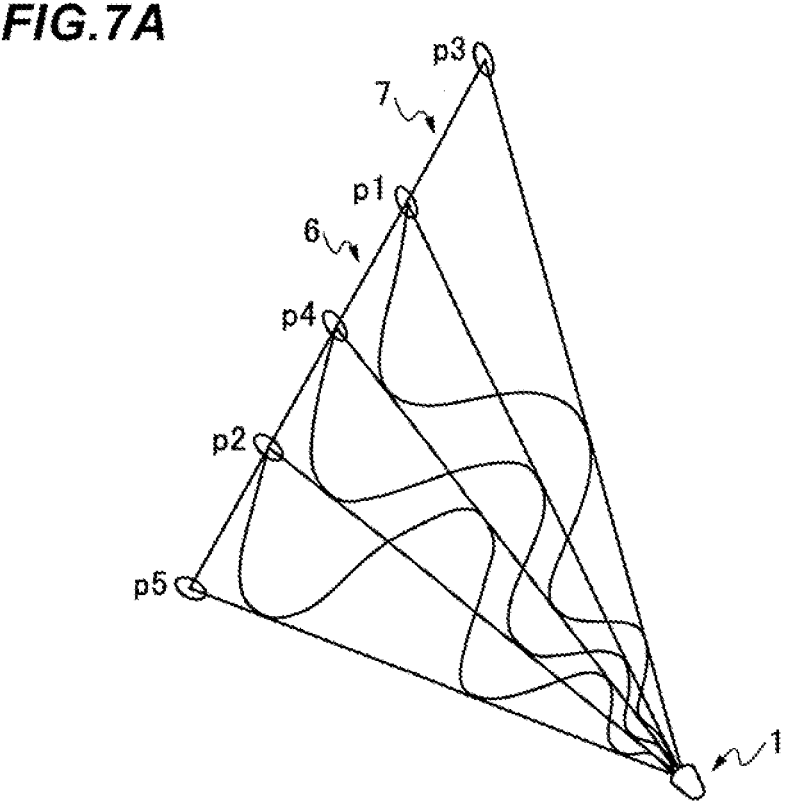
FIG. 7A is a plan view of the nozzle body of the washer nozzle of the present invention in which the numbers of the upper and lower spray orifices are different, and the upper spray orifice is formed to have the liquid spray diffusion angle of 30 degrees and the lower spray orifice is formed to have the liquid spray diffusion angle of 60 degrees to divide the liquid spray into two parts, illustrating a state of diffusion of the liquid spray when the length of the guide area is set to substantially 0 mm.
Figure 7B:
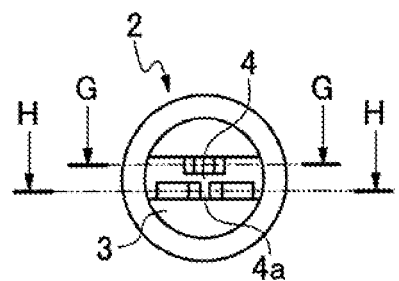
FIG. 7B is a front view of the nozzle body of the washer nozzle of the present invention illustrated in FIG. 7A.
Figure 7C:
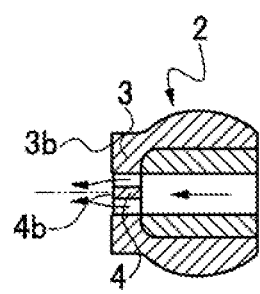
FIG. 7C is a vertical cross-sectional view of the nozzle body illustrated in FIG. 7B.
Figure 7D:
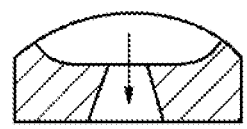
FIG. 7D is a cross-sectional view taken along the line G-G in FIG. 7B.
Figure 7E:
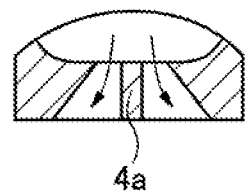
FIG. 7E is a cross-sectional view taken along the line H-H in FIG. 7B.

In contrast, as illustrated in FIG. 7A, when the length of the guide area is short and, for example, close to 0 mm, the upper and lower liquid sprays 6, 7 are sprayed by being joined into one thin layer, and the concentrated parts (p1 to p5) of the liquid spray are generated at five positions on the same spray surface.

The washer nozzle according to the present invention is available as a cleaning liquid spray apparatus for various conveyances such as a motor vehicle.

The invention claimed is:

1. A washer nozzle comprising: a nozzle body; a nozzle tip to be mounted in the interior of the nozzle body; and a nozzle holder having a head portion configured to store the nozzle body and a supply portion configured to supply cleaning liquid,
the nozzle body including: a spray orifice configured to spray the cleaning liquid; a partitioning plate configured to partition the spray orifice into two-tiered parts; and a guide portion configured to be projected from an outer peripheral portion of the spray orifice of the nozzle body along the direction of a center axis of the nozzle body in order to guide a liquid spray sprayed from the spray orifice,
wherein the guide portion is provided with a variable length part configured to change a length of the guide portion along a direction of the center axis of the nozzle body, whereby by changing the length of the guide portion, a length of a guide area from a distal end surface of the partitioning plate to a distal end surface of the guide portion is made variable,
wherein the variable length part comprises at least one slit formed on an outer peripheral surface of the guide portion, and is formed so as to allow the guide portion to be cut along one slit of said at least one slit, and
wherein the guide portion comprises inner guide surfaces facing each other that have a constant inner separation between them along the entire length of the guide portion, including the guide area.

2. The washer nozzle according to claim 1, wherein the partitioning plate for partitioning the spray orifice of the nozzle body into the two-tiered portions includes front and back surfaces parallel to each other.

3. The washer nozzle according to claim 1, wherein the guide portion includes a pair of guide plates projecting so as to extend from upper and lower positions of the outer peripheral portion of the spray orifice along the direction of the center axis, and a length a of the guide area is within a range of 0 mm<a≤0.2 mm.

4. The washer nozzle according to claim 1, wherein said at least one slit comprises a plurality of slits spaced apart at intervals along the direction of the center axis.

5. The washer nozzle according to claim 1, wherein said at least one slit is constituted by a plurality of slits that are formed in each of the pair of guide plates and are spaced apart at intervals along the direction of the center axis.

6. A washer nozzle comprising: a nozzle body; a nozzle tip to be mounted in the interior of the nozzle body; and a nozzle holder having a head portion configured to store the nozzle body and a supply portion configured to supply cleaning liquid,
the nozzle body including: a spray orifice configured to spray the cleaning liquid; a partitioning plate configured to partition the spray orifice into two-tiered parts; and a guide portion configured to be projected from an outer peripheral portion of the spray orifice of the nozzle body along the direction of a center axis of the nozzle body in order to guide a liquid spray sprayed from the spray orifice,
wherein the guide portion is provided with a variable length part configured to change a length of the guide portion along a direction of the center axis of the nozzle body, whereby by changing the length of the guide portion, a length of a guide area from a distal end surface of the partitioning plate to a distal end surface of the guide portion is made variable,
wherein the variable length part comprises at least one slit formed on an outer peripheral surface of the guide portion, and is formed so as to allow the guide portion to be cut along one slit of said at least one slit;
wherein the guide portion includes a pair of guide plates projecting so as to extend from upper and lower positions of the outer peripheral portion of the spray orifice along the direction of the center axis, and wherein said at least one slit is constituted by at least one slit formed in each of the pair of guide plates, and
wherein the guide plates comprise inner guide surfaces facing each other that have a constant inner separation between them along the entire length of the guide portion, including the guide area.

7. The washer nozzle according to claim 6, wherein the inner guide surfaces are flat guide surfaces.

8. The washer nozzle according to claim 6, wherein the partitioning plate for partitioning the spray orifice of the nozzle body into the two-tiered portions includes front and back surfaces parallel to each other.

9. The washer nozzle according to claim 6, wherein the guide plates project so as to extend from upper and lower positions of the outer peripheral portion of the spray orifice along the direction of the center axis, and a length a of the guide area is within a range of 0 mm<a≤0.2 mm.

10. The washer nozzle according to claim 6, wherein said at least one slit comprises a plurality of slits spaced apart at intervals along the direction of the center axis.

11. The washer nozzle according to claim 6, wherein said at least one slit is constituted by a plurality of slits that are formed in each of the guide plates and are spaced apart at intervals along the direction of the center axis.

* * * * *